US008435103B2

(12) United States Patent
Centofante (10) Patent No.: US 8,435,103 B2
(45) Date of Patent: May 7, 2013

(54) AIR CONDITIONING ARRANGEMENT FOR AN AIRCRAFT WITH A PLURALITY OF CLIMATE ZONES THAT MAY BE INDIVIDUALLY TEMPERATURE-CONTROLLED

(75) Inventor: Nico Centofante, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 1121 days.

(21) Appl. No.: 12/162,147

(22) PCT Filed: Jan. 11, 2007

(86) PCT No.: PCT/EP2007/000225
§ 371 (c)(1),
(2), (4) Date: Feb. 12, 2009

(87) PCT Pub. No.: WO2007/087974
PCT Pub. Date: Aug. 9, 2007

(65) Prior Publication Data
US 2009/0221224 A1 Sep. 3, 2009

(30) Foreign Application Priority Data

Feb. 3, 2006 (DE) .......................... 10 2006 005 037

(51) Int. Cl.
*B64D 13/02* (2006.01)
(52) U.S. Cl.
USPC ............................................. 454/71; 454/76
(58) Field of Classification Search .................... 454/71, 454/76, 77
See application file for complete search history.

(56) References Cited

U.S. PATENT DOCUMENTS

| 4,684,081 A | * | 8/1987 | Cronin | 244/58 |
| 4,984,432 A | | 1/1991 | Corey | |
| 4,996,841 A | * | 3/1991 | Meijer et al. | 60/525 |

(Continued)

FOREIGN PATENT DOCUMENTS

| DE | 4308466 | 8/1994 |
| DE | 10361392 | 7/2005 |

(Continued)

OTHER PUBLICATIONS

International Search Report, PCT Form Nos. PCT/ISA/220 (Notification of Transmittal), PCT/ISA/210 (International Search Report), and PCT/ISA/237 (Written Opinion).

*Primary Examiner* — John Fox
*Assistant Examiner* — Seth Faulb
(74) *Attorney, Agent, or Firm* — Wood, Herron & Evans, LLP (57) ABSTRACT

An air conditioning arrangement for an aircraft with a plurality of climate zones that may be individually temperature-controlled includes a main branching system having an air supply feed path system with a mixing chamber and a plurality of sub-branching systems branching from the mixing chamber and leading to one of the climate zones in each case. Basic temperature control means are used for controlling the temperature of the air supply in the mixing chamber. Individual temperature-control means are used on the other hand for individually controlling the temperature of the air supply in each of the sub-branching systems as a function of a desired temperature value of the respective climate zone. Basic temperature control of the air supply in the mixing chamber preferably takes place independently of a temperature requirement of the climate zone with associated combined heat and power engine.

10 Claims, 3 Drawing Sheets

U.S. PATENT DOCUMENTS

| | | | |
|---|---|---|---|
| 5,442,905 A * | 8/1995 | Claeys et al. | 60/785 |
| 5,479,983 A * | 1/1996 | Fischer et al. | 165/205 |
| 5,545,084 A | 8/1996 | Fischer et al. | |
| 5,967,461 A * | 10/1999 | Farrington | 244/118.5 |
| 6,159,091 A * | 12/2000 | Horstman et al. | 454/76 |
| 6,216,981 B1 * | 4/2001 | Helm | 244/118.5 |
| 6,389,826 B2 * | 5/2002 | Buchholz et al. | 62/172 |

FOREIGN PATENT DOCUMENTS

| | | |
|---|---|---|
| DE | 10361709 | 8/2005 |
| EP | 0683744 | 5/1997 |
| FR | 2702547 | 9/1994 |
| FR | 2773392 | 7/1999 |
| JP | 2005349912 | 12/2005 |
| WO | 2005/063575 | 7/2005 |

* cited by examiner

AIR CONDITIONING ARRANGEMENT FOR AN AIRCRAFT WITH A PLURALITY OF CLIMATE ZONES THAT MAY BE INDIVIDUALLY TEMPERATURE-CONTROLLED

CROSS-REFERENCE TO RELATED APPLICATIONS

This application claims priority to International Application No. PCT/EP2007/000225, filed on Jan. 11, 2007, and German Application No. 10 2006 005 037.1, filed on Feb. 3, 2006.

TECHNICAL FIELD

The invention relates in particular to the air conditioning of aircraft interiors, but may also be transferred to the air conditioning of any other desired premises per se.

BACKGROUND

In modern commercial aircraft, the aircraft interior is usually divided into a plurality of climate zones which can each be temperature-controlled separately and individually. Not only is it thus possible to keep the temperature in a specific interior region more constant, because temperature control of a smaller spatial region is always easier than temperate control of a larger spatial region, it is also thus possible to adjust different temperatures in different spatial regions, so the comfort-related expectations of cabin crew and/or air passengers may be individually catered to in the individual climate zones.

At the end of the main branching system there is situated the mixing chamber from which the sub-branching systems come off. The climate zones with a higher temperature requirement than that which is decisive for the basic temperature control of the air supply then only require individual heating of the air conveyed in the relevant sub-branching systems, and, more precisely, as a function of the respective desired value of the supply air temperature of the relevant climate zone. This heating is conventionally provided by targeted introduction of hot bleed air into the sub-branching system or/and by electrical heating units.

The temperature requirement of a climate zone depends on the difference between measured ambient, temperature in the climate zone and the desired value of the ambient temperature. If the temperature measurement in one climate zone wrongly indicates an excessively high actual ambient, temperature, for the relevant climate zone this (wrongly) means an excessively low temperature requirement. If a higher temperature requirement is detected for all other climate zones then this means that the climate, zone with the incorrectly measured ambient, temperature determines the basic temperature control of the air supply in the mixing chamber. Errors in temperature measurement can occur in any climate zone, regardless of the size of the zone. If however this kind of incorrect measurement occurs in a comparatively small or/and insignificant climate zone, for example a rest room for the cabin crew, then this means that the temperature requirement of a very small part of the overall interior region of the aircraft to be air conditioned determines the basic temperature control of the air supply in the mixing chamber and most of the remainder requires individual heating of the air supply in the corresponding sub-branching systems. Understandably this is not very economical. The high heating requirement of the remaining climate zones can also exceed the heating capacity of the available heat sources with the potential result of air being supplied at an excessively low temperature in climate zones that are regarded as important, such as in a first class section.

The object of the invention is to disclose a method of how the air conditioning of a multi-zone interior, in particular of an aircraft, can be configured so as to be economical as a whole and how available heat sources for individual temperature control of the air supply can be kept: more efficiently within the scope of their heating capacity.

SUMMARY OF THE INVENTION

When achieving the solution to this object, the invention starts from an air conditioning arrangement for an aircraft or other premises with a plurality of climate zones that may be individually temperature-controlled, comprising:

an air supply feed path system with a mixing chamber and a plurality of sub-branching systems branching off from the mixing chamber and leading to one of the climate zones in each case, basic temperature control means for controlling the temperature of the air supply in the mixing chamber as a function of at least one desired temperature value, individual temperature-control means for individually controlling the temperature of the air supply in each of the sub-branching systems as a function of a desired temperature value of the respective climate zone.

According to the invention it is provided that, the individual temperature-control means, in allocation to at least one of the climate zones, comprise at least one combined heat; and power engine operating according to a thermodynamic cyclic process.

The combined heat and power engine is an engine which converts the supplied mechanical energy into thermal energy. Within the context of the thermodynamic cyclic process the engine produces or intensifies a temperature difference between two heat exchange surfaces, of which one may be used as a useful heat exchange surface for controlling the temperature of an air flow and of which the other can serve as a free heat exchange surface via which thermal energy is absorbed from the surroundings or can be released to them. According to a preferred development the combined heat and power engine is a Stirling engine. The ideal Stirling cyclic process with two isochoric and two isothermal changes of state approximates the Carnot cyclic process very closely, for which reason its attainable degree of efficiency is comparatively high. It is understood that a practical Stirling engine does not execute an ideal Stirling process, but only an approximation that is practicable under conditions of reality. Stirling engines are commercially obtainable as such. They are described, in the prior art for motive use and for use as heat pumps or cold pumps.

A limitation to Stirling engines is not intended within the scope of the invention, however. Basically combined heat and power engines which operate according to other reversible thermodynamic cyclic processes, for example the Carnot process, the Claudius-Rankine process or the Ericsson process, may in principle also be used.

Combined heat and power engines, such as the Stirling engine in particular, make it possible to cool an air flow in addition to heating it. For the basic temperature control, of the air supply this property allows the temperature requirement of individual, in particular comparatively small climate zones, to be ignored and thus the basic temperature of the air supply to be set at a level which potentially lies above the required temperature level for the climate zones not considered. By allocation of at least one respective combined neat and power engine to the sub-branching system of each climate zone not considered, the air supply may be cooled or heated in these sub-branching systems below or above the basic level, as required. The climate zones considered for determining the required basic temperature of the air supply may also be restricted to those which are of primary importance for example owing to their extent and/or use. In particular for example, the cockpit region and those cabin regions in which air passengers stay may be considered. A limitation of this kind to priority climate zones makes it possible to gear basic temperature control of the air supply more efficiently towards the temperature requirements of the decisive regions of the aircraft interior. Operation of the air conditioning arrangement may thus be more designed more economically as a whole since the situation can be avoided where a very low temperature requirement (possibly based on an error) of a comparatively unimportant climate zone leads to a basic level of the air supply temperature that is relatively low overall, with the result that the air supply also has to be unnecessarily individually heated for a large proportion of the interior regions that are to be air conditioned. Overtaxing of the available heat sources may be better avoided hereby.

An advantage of the reversibly operating combined heat and power engines considered here is that they can be markedly low-maintenance since what is involved is a closed system in which no combustion processes take place. Their noise development is also low and they are usually sufficiently low in vibration.

To be able to optionally use the combined heat and power engine for cooling or heating preferred embodiment of the invention provides that the engine is in driving connection or can be brought into driving connection with a drive motor configured for operation in opposed directions of rotation and which is controlled by a control arrangement set up to reverse the direction of rotation of the drive motor. The combined heat and power engine with a useful heat exchange surface is arranged in an air conduit system which in opposed directions of flow allows a moderating air flow via the useful heat exchange surface toward the sub-branching system of the relevant climate zone. Within the scope of the invention the intention is obviously basically not to rule out using the combined heat and power engine to exclusively cool or to exclusively heat an air flow to be introduced into a sub-branching system. In this case it is sufficient to arrange the useful heat exchange surface of the combined heat and power engine in an air conduit system which allows only one flow direction of the air flow to be moderated via this heat exchange surface. The control arrangement does not have to be configured to be able to reverse the direction of rotation of the drive motor in this case either.

The combined heat and power engine is expediently associated with a fan arrangement which generates or boosts a moderating air flow conveyed via a useful heat exchange surface of the engine and which is to be introduced into the associated sub-branching system of the relevant climate zone. The valve arrangement can, in the flow direction of the moderating air flow on either side of the combined heat and power engine, comprise at least one respective fan. Alternatively there can also be a fan provided in the flow direction of the moderating air flow on just one side of the combined heat and power engine.

For use of the combined heat and power engine for both cooling and heating purposes it is preferably provided that at least one fan of the fan arrangement is in driving connection or can be brought into driving connection with a drive motor configured for operation in opposed directions of rotation and which is controlled by a control arrangement set up to reverse the direction of rotation of the drive motor.

The moderating air flow conveyed via the useful heat exchange surface of the combined heat and power engine and which is introduced into the sub-branching system of a climate zone for individual elevation or lowering of the air supply temperature, can be directly fed from the air supply conveyed in this sub-branching system. In a modified embodiment the moderating air flow, or at least the thermal energy thereof, is taken from an outgoing air region of the aircraft on the other hand. In this case the outgoing air region is taken to mean a region within the aircraft in which the air is no longer required for air conditioning. In modern commercial aircraft, located below the cabin accommodating the air passengers and the air crew there is an underfloor region which inter alia is used to accommodate freight, wherein what is known as the bilge is situated below the underfloor region. In commercial aircraft of this type the air supply is conventionally introduced into the cabin from above. It laterally passes the fuselage wall from the cabin into the underfloor region and from there into the bilge. The air flow conveyed by the combined heat and power engine can for example be taken from the outgoing air in the bilge.

In one embodiment of the invention the individual temperature control means comprises at least one respective combined heat and power engine only in allocation to a partial number of the climate zones. In particular a respective combined heat and power engine is only allocated to those climate zones, of which the temperature requirement is not considered in the case of basic temperature control of the air supply. The basic temperature control means may therefore be set up to control the temperature of the air supply in the mixing chamber as a function of a desired temperature value of at least one, in particular each, climate zone without associated combined heat and power engine, although independently of a desired temperature value of at least one, in particular each, climate zone with associated combined heat and power engine. In the climate zones without associated combined heat and power engines the air supply conveyed in the respective sub-branching systems may be individually temperature controlled as in the prior art for example by means of electrical heating units or/and by introducing hot bleed air.

BRIEF DESCRIPTION OF THE DRAWINGS

The invention will be described in more detail hereinafter with reference to the accompanying schematic drawings, in which.

DETAILED DESCRIPTION

Figure 1:
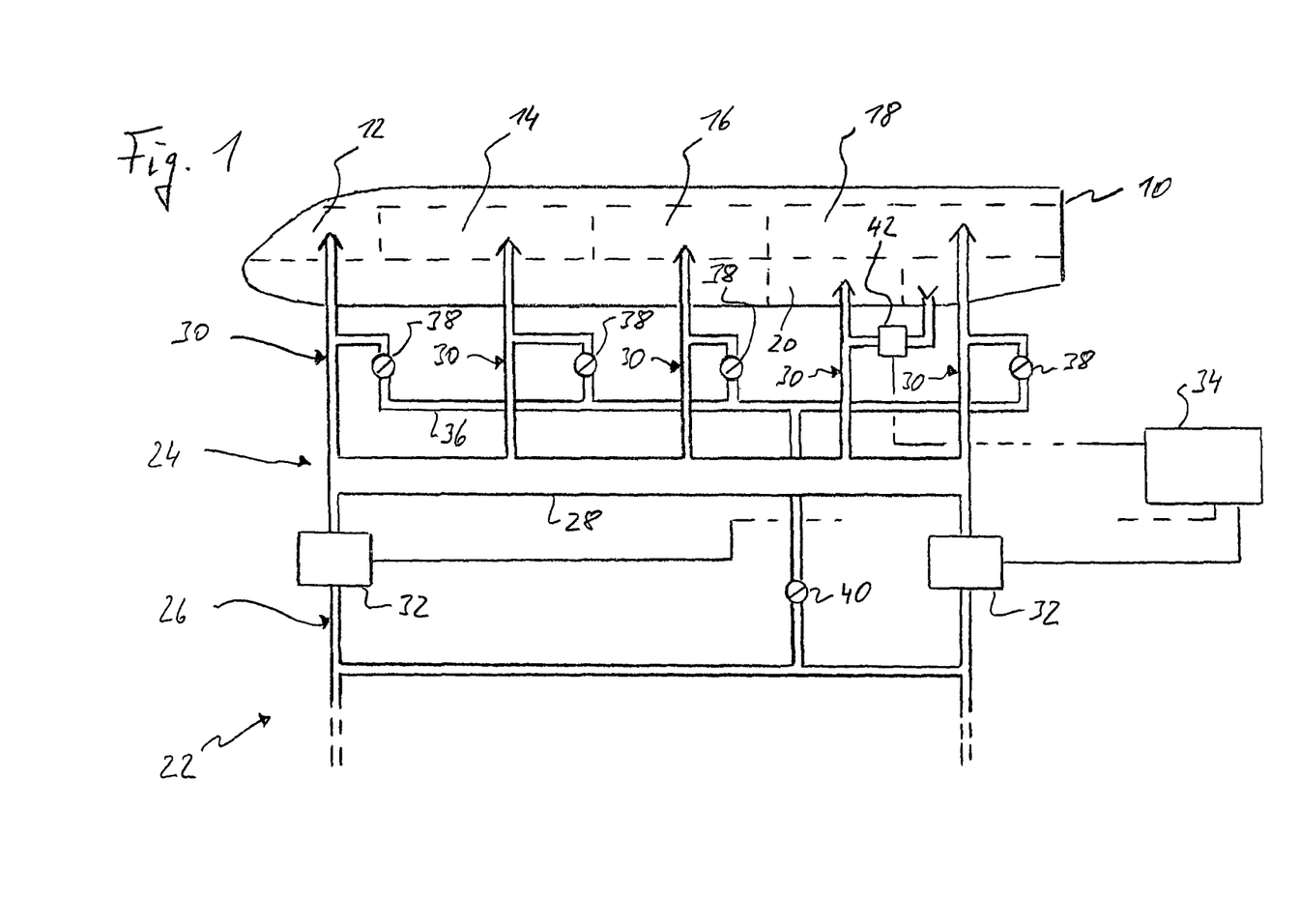
FIG. 1 shows an overall overview of an aircraft air conditioning arrangement according to one embodiment of the invention.

In FIG. 1, a plurality of climate zones 12, 14, 16, 18, 20 that may be individually temperature-controlled, is formed in the interior of a highly schematic aircraft 10. A total of five such climate zones are formed in the example of FIG. 1. Climate zone 12 comprises the aircraft cockpit, while climate zones 14, 16, 18 contain various passenger regions of the aircraft cabin. Climate zone 20 is a cabin region which is used only for temporary detention of persons, in particular a rest room for the cabin crew. It is understood that this useful division of the various climate zones is only exemplary and a different configuration of the climate zones may be selected at any time. It is also understood that the sketched arrangement of the climate zones in FIG. 1 is based only a schematic representation and is not necessarily true to reality.

An air conditioning arrangement 22, which supplies the climate zones with a temperature-controlled air supply via an air supply feed path system 24, is used for air conditioning the climate zones 12 to 20. The feed path system 24 comprises a main branching system 26 with a mixing chamber 28 and a plurality of sub-branching systems 30 branching off from the mixing chamber 28 and each associated with one of the climate zones 12 to 20. Each of the sub-branching systems 30 guides the fresh air supply conveyed therein to one or more air outlet(s) at which the air supply is blown into the relevant climate zone. The consumed air is conveyed in a manner not shown into a bilge formed in the lower fuselage region of the aircraft, and from there is released, at least partially via an outlet valve, to the external surroundings. A portion of the consumed air supply may also be recirculated and conveyed back into the mixing chamber 28.

The air conditioning arrangement 22 comprises a basic temperature control part which brings about basic temperature control of at least the air supply in the mixing chamber 28, so the air supply in the mixing chamber 28 has a specific basic temperature level. The basic temperature control part in particular comprises one or more air conditioning unit(s) 32 which cool hot air, originating from bleed air and supplied via the main branching system 26, to the desired basic temperature level. It is understood that between the point at which the bleed air from the engine (s) of the aircraft 10 is removed and the air conditioning units 32 a number of components (not shown) for through-flow control or/and pre-moderation or/and humidifying may be arranged in the main branching system 26.

The air conditioning units 32 are controlled by an electronic climate control, arrangement 34, shown schematically as a single block in FIG. 1, as a function of temperature requirements of at least a portion of the climate zones 12 to 20. In particular the climate control arrangement 34 controls the air conditioning units 32 as a function of temperature requirements of the climate zones 12, 14, 16, 18 but independently of a temperature requirement of the climate zone 20.

One or more temperature sensor(s) in each case are provided in a manner known per se, and therefore not shown, in each climate zone for determining the temperature requirements of the climate zones 12 to 20. The measuring signals of the sensors are evaluated by the climate control arrangement 34 for determining an ambient temperature actual value for each climate zone. In a manner that is also not shown, an ambient temperature desired value may also be stipulated for each of the climate zones 12 to 20, for example, at the control panel in the cockpit or in the passenger region of the aircraft 10. The cabin crew can individually set a respectively desired ambient temperature desired value for each climate zone at a control panel of this type. The climate control arrangement 34, which in practice does not have to be constructed as a single module but can be divided among various, part modules optionally partially operating independently of each other, determines from the ambient temperature actual values and ambient temperature desired values a respective ambient temperature deviation for each of the climate zones 12 to 20. The climate control arrangement 34 also calculates from the ambient temperature deviations of the climate zones, a respective desired value of the supply air temperature for each climate zone. Additional temperature sensors, not shown in FIG. 1, measure the temperature of the air supply in the sub-branching systems 30, in particular close to the air outlets into the climate zones 12 to 20. The measured values obtained in this connection are compared by the climate control arrangement 34 as supply air temperature actual values with the supply air temperature desired values of the climate zones to thus calculate a supply air temperature deviation for each climate zone.

For basic temperature control of the air supply in the mixing chamber 28 the climate control arrangement 34 uses the desired values of the supply air temperatures, determined in the above-described manner, of the climate zones 12, 14, 16, 18 but not the desired value of the supply air temperature of the climate zone 20. The coldest desired value of the supply air temperature of the climate zones 12 to 18 establishes the basic temperature level of the air supply which the climate control arrangement brings about by corresponding control of the climate units 32. The temperature of the air supply in the mixing chamber 28 is accordingly set so low that no subsequent ducted cooling in the respective sub-branching system 20 is required for any of the climate zones 12 to 18. A temperature elevation is subsequently required in the respective sub-branching system 30, at least for those climate zones 12 to 18 of which the temperature requirement (represented by the respective desired value of the supply air temperature) is higher than the lowest temperature requirement of the climate zones 12 to 18 that is decisive for the basic temperature control of the air supply in the mixing chamber 28, in order to attain the desired level of the supply air temperature.

Apart from the basic temperature control part with the air conditioning units 32, the air conditioning arrangement 22 also comprises an individual temperature control part which allows individual temperature control of the fresh air supply conveyed in the sub-branching system 20 of the climate zones 12 to 20. For the climate zones 12 to 18, this individual temperature control part provides introduction, of hot air into the respective sub-branching system 30, wherein this hot air originates from the bleed air. The hot air is advanced via an individual temperature control hot air conduit system 36 connected to the main branching system 26 of the air supply feed path system 24 upstream of the air conditioning units 32, and in each case, can be introduced purposefully metered via an individual regulating valve 38 into the associated sub-branching system 30 of each of the climate zones 12 to 18. The individual regulating valves 38 can be controlled by the climate control arrangement 34 like a global regulating valve 40 that regulates the hot air supply into the individual temperature control hot air conduit system 36.

For the climate zone 20, of which the sub-branching system 30 is not connected to the individual temperature control hot air conduit system 36, the individual temperature control part of the air conditioning arrangement 22 on the other hand provides a combined heat and power converter arrangement 42 operating according to a reversible thermodynamic cyclic process, in particular the Stirling process, which arrangement can elevate or lower an air flow that does not originate from bleed air to a desired temperature level and feeds the thus temperature-controlled air flow into the sub-branching system 30 of the climate zone 20. The combined heat and power converter arrangement 42 may also be controlled by the climate control arrangement 34.

While basic temperature control of the air supply in the mixing chamber 28 takes place in the above-described manner according to the coldest temperature requirement of the climate zones 12 to 18, the individual regulating valves 38 and the combined heat and power converter arrangement 42 are controlled as a function of the supply air temperature deviation of the climate zones. The temperature of the air supply blown-in is thus individually adjusted for each of the climate zones 12 to 20 to the respective desired value of the supply air temperature at this location. As the climate zone 20 does not have any effect on the basic temperature control of the air supply in the mixing chamber 28 it may be that the basic temperature level of the air supply caused by the climate control arrangement 34 in the mixing chamber 28 lies above the temperature requirement of the climate zone 20. Since the thermodynamic combined heat and power converter arrangement 42 allows effective cooling, if required, in addition to heating of the supplied air flow, the desired climate may be attained in climate zone 20 at any time as well.

It is understood that the configuration shown in FIG. 1 is only exemplary and modifications may be made at any time. In particular more than one climate zone may be provided which is decoupled from the individual temperature control hot air conduit system 36, wherein basic temperature control of the air supply in the mixing chamber 28 takes place accordingly, independently of the temperature requirements of this plurality of climate zones. Reference is explicitly made however to the fact that the invention is in no way limited to configurations in which the basic temperature control of the air supply is independent of the temperature requirement of one or more climate zone(s) with associated thermodynamic combined heat and power converter arrangement. It is by all means conceivable to also consider climate zones in the basic temperature control of the air supply which can be individually temperature controlled by means of a thermodynamic combined heat and power converter arrangement.

Figure 2:
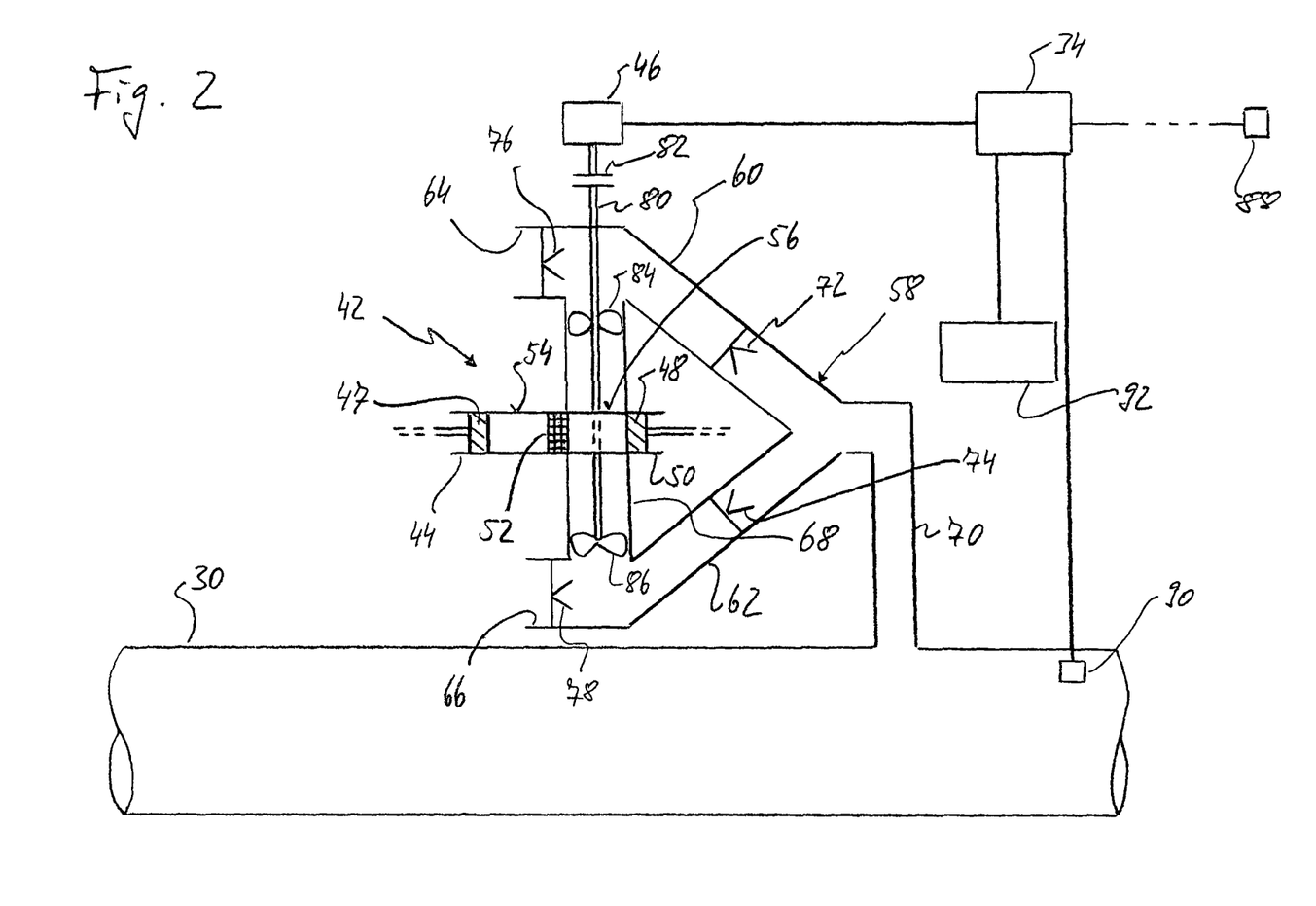
FIG. 2 shows a first fitted variant of a combined heat and power engine of the air conditioning arrangement of FIG. 1

Reference is now made to FIG. 2. This shows further details of the thermodynamic combined heat and power converter arrangement 42. The converter arrangement 42 comprises as an essential component a combined heat and power engine 44, in particular a Stirling engine, which can optionally be operated as a heat pump or a refrigerating engine and which in the illustrated example is constructed as a piston-cylinder unit in what is known as an α configuration. It is understood that instead of a piston-cylinder configuration of the combined heat and power engine 44 other configurations are possible, for example those with wobble plates or a Wankel rotor. It is also understood that the illustrated α configuration of the piston-cylinder engine 44 can also be replaced by other configurations, for example a β configuration of a γ configuration. A restriction to specific configurational forms of the combined heat and power engine 44 is in no way intended within the scope of the invention.

The combined heat and power engine 44 is coupled to an electromotive drive unit 46 and can be driven thereby. Owing to the schematic representation FIG. 2 does not show the drive coupling between the drive unit 46 and the engine 44 in detail. The specific embodiment of this drive coupling is not significant within the scope of the invention, however, for which reason it does not need to be discussed in more detail. Commercially available Stirling engines and other combined heat and power engines are equipped with suitable mechanical interfaces for connection, of an electrical engine, however, for which reason a person skilled in the art may produce a suitable mechanical coupling between the drive unit 46 and the engine 44 at any time.

In the example, being considered of using a Stirling engine in an α configuration, the engine 44 comprises two pistons 47, 48 driven by the drive unit 46 and which are axially movable in a cylinder 50. The two pistons between them surround a working gas. A regenerator 52 is also provided in the space between the two pistons 47, 48. The mode of operation of a Stirling engine of this type is known per se. At this point the reference that within the framework of the thermodynamic cyclic process executed by it, it passes through two isochoric changes in state as well as—with practical engines—two polytropic changes in state, suffices. Detailed descriptions of the mode of operation of real Stirling engines can be found in the relevant literature.

The combined heat and power engine 44 has two heat exchange surfaces 54, 56 between which, during operation of the engine 44, a temperature gradient is established. The combined heat and power engine 44 is installed in such a way that, one of its heat exchange surfaces, namely the heat exchange surface 56 in the example of FIG. 2, is located in the flow path of the air flow being used for temperature control of the air in the relevant sub-branching system 30. The other heat exchange surface, surface 54 in this case, is arranged outside of this flow path on the other hand and is used as a free heat exchange surface via which thermal energy is absorbed by the surroundings or released thereto, depending on the operating mode of the engine 44.

Specifically in the example of FIG. 2, the combined heat and power engine 44, with its useful heat exchange surface 56, is arranged in an air conduit system 58 ending in the relevant sub-branching system 30 and which comprises two parallel conduit branches 60, 62, each with an air inlet 64 or 66, a bridging branch 68 running between the two parallel conduit branches, as well as a common conduit branch 70 which runs between a confluence point of the two conduit branches 60, 62 and the relevant sub-branching system 30. In each of the two parallel conduit branches 60, 62, there is arranged a respective non-return valve 72 or 74. A respective non-return valve 76 or 78 is also arranged in the two air inlets 64, 66. The combined heat and power engine 44 is installed in such a way that the useful heat exchange surface 56 is arranged in the bridging branch 68 of the air conduit system 58 and can move air flowing in this bridging branch 68 along the useful heat exchange surface 56 in order to absorb thermal energy from the surface 56 or release it thereto.

In addition to the combined heat and power engine 44, an arrangement with two fans 84, 86 is coupled, or can be coupled, in driving terms via a drive shaft arrangement 80, which if required can include a coupling 82, to the drive unit 46, the fans being arranged in the bridging branch 68 of the air conduit system 58 and being located on either side of the useful heat exchange surface 56, i.e. upstream and downstream, in the flow direction of the air flowing in this branch 68. On rotation the fans 84, 86 produce or boost an air flow in the bridging branch 68. It is understood that the number of fans and their installation site (on just one side of the heat exchange surface 56 or on both sides) can vary, for example as a function of the implemented output or/and the size of the heat exchange surface 56 or/and the flow cross-section of the branch 68.

The climate control arrangement 34 (or a part module of the control arrangement 34 used solely for controlling the individual moderation of the relevant climate zone) is set up to control the direction of rotation of the drive unit 46 and the rotational speed thereof as a function of the supply air temperature deviation of the relevant climate zone, i.e. climate zone 20 in FIG. 1 for example. The useful heat exchange surface 56 of combined heat and power engine 44 coupled to the drive unit 46 is the hotter or the colder of the two heat exchange surfaces 54, 56, depending on the direction of rotation of the drive unit 46. Accordingly the air flowing in the bridging branch 68 is either heated or cooled, depending on the direction of rotation of the drive unit 46. The temperature level of the useful heat exchange surface 56 depends in this case on the rotational speed of the drive unit 46, for which reason a different level of heating or cooling of the air flowing in the bridging branch 68 is brought about, depending on the rotational speed of the drive unit 46.

With driving of the driving unit in one direction of rotation the rotating fans 84, 86 cause suction in the bridging branch 68 which leads to opening of the non-return valve 76, so air flows through the inlet 64 and passes into the bridging branch 68. The inflowing air pushes open the non-return valve 74 in the conduit branch 62 and finally passes via the common conduit branch 70 into the sub-branching system 30. With driving in the opposite direction of rotation on the other hand suction in the opposite direction is produced in the bridging branch 68 by the fans 84, 86, so air flows through the inlet 66 into the bridging branch 68. This inflowing air then pushes open the non-return valve 72 in the conduit branch 70 and flows through the conduit branch 60 and the common conduit branch 70 into the sub-branching system 30. The air inlets 64, 66 can for example be located in the bilge of the aircraft. The installation site of the combined heat and power engine 44 in the aircraft is preferably such that the free heat exchange surface 54 is also located in the outgoing air region of the aircraft, so the positive or negative thermal energy intake required for heating or cooling of the air flow in the bridging branch 68 originates from the outgoing air of the aircraft. Alternatively it is conceivable to use the positive or negative waste heat from the free heat exchange surface 54 for purposeful opposed temperature control of a different region of the aircraft.

Also drawn in FIG. 2 is a temperature sensor 88 which measures the actual ambient temperature in the climate zone provided by the sub-branching system 30, and a further temperature sensor 90 which measures the actual temperature of the fresh air supply conveyed in the sub-branching system 30. The second measured value is representative of the above-mentioned actual value of the supply air temperature. As described above, the climate control arrangement 34 determines from the measured values supplied by the sensors 88, 90 and an ambient temperature desired value for the relevant climate zone that may be stipulated at a control panel 92 by cabin crew, a supply air temperature deviation and controls the drive unit 46 in the sense of an elimination of this deviation.

Figure 3:
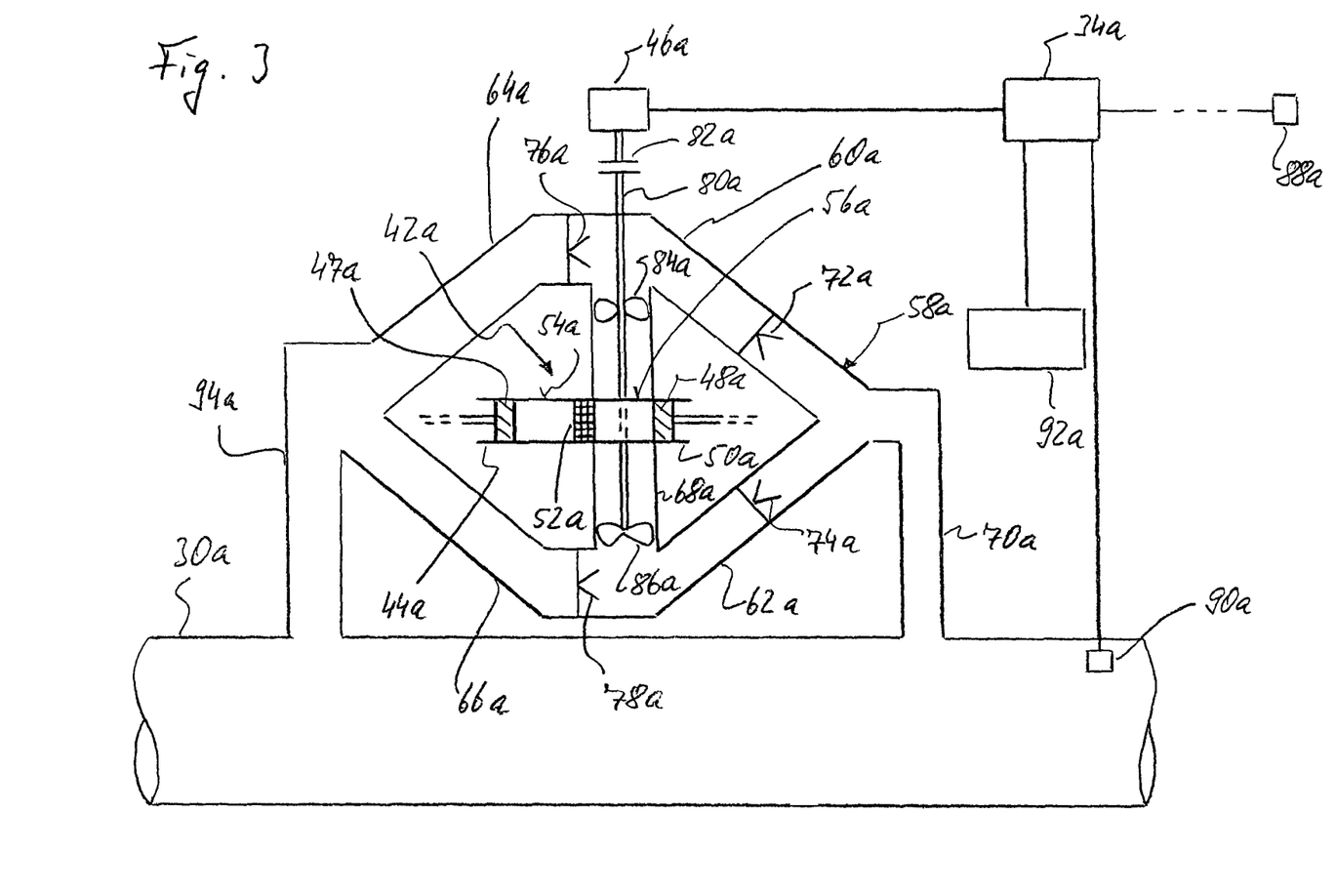
FIG. 3 shows a second fitted variant of a combined heat and power engine of this type.

In FIG. 3 identical or identically-acting components are designated by the same reference numerals as before, albeit supplemented by a lowercase letter. The variant shown in this figure differs from that in FIG. 2 in that the air flow conveyed via the useful heat exchange surface 56*a* of the combined heat and power engine 44*a* is taken directly from the fresh air supply conveyed in the sub-branching system 30*a*. For this purpose the air inlets 64*a*, 66*a* have been developed into parallel conduit branches which are connected to the sub-branching system 30*a* by a further common conduit branch 94*a* upstream of the conduit branch 70*a*. Air thus flows from the sub-branching system 30*a* either through the inlet branch 64*a* or the inlet branch 66*a*, depending on the produced suction direction in the bridging branch 68*a*.

The invention claimed is:

1. An air conditioning arrangement for an aircraft or other premises with a plurality of climate zones that may be individually temperature-controlled, comprising:
   an air supply feed path system with a mixing chamber and a plurality of sub-branching systems branching off from the mixing chamber and leading to one of the climate zones in each case,
   basic temperature control means for controlling the temperature of the air supply in the mixing chamber as a function of at least one desired temperature value, and
   individual temperature-control means for individually controlling the temperature of the air supply in each of the sub-branching systems as a function of a desired temperature value of the respective climate zone, wherein the individual temperature-control means, in allocation to only a partial number of the climate zones, comprise at least one combined heat and power engine operating according to a thermodynamic cyclic process,
   wherein the basic temperature-control means control the temperature of the air supply in the mixing chamber (i) as a function of a desired temperature value of at least one climate zone that is not associated with a combined heat and power engine, but (ii) independently and not as a function of a desired temperature value of at least one climate zone that is associated with a combined heat and power engine.

2. The air conditioning arrangement according to claim 1, wherein the combined heat and power engine is a Stirling engine.

3. The air conditioning arrangement according to claim 1, wherein the combined heat and power engine is in driving connection or can be brought into driving connection with a drive motor configured for operation in opposed directions of rotation and which is controlled by a control arrangement set up to reverse the direction of rotation of the drive motor, wherein the combined heat and power engine with a useful heat exchange surface is arranged in an air conduit system which in opposed directions of flow allows a moderating air flow via the useful heat exchange surface toward the sub-branching system of the relevant climate zone.

4. The air conditioning arrangement according to claim 1, wherein a moderating air stream conveyed via a useful heat exchange surface of the combined heat and power engine and which is to be introduced into the associated sub-branching system of the relevant climate zone is fed from the air supply conveyed in this sub-branching.

5. The air conditioning arrangement according claim 1, wherein a moderating air stream conveyed via a useful heat exchange surface of the combined heat and power engine and which is to be introduced into the associated sub-branching system of the relevant climate zone, or the thermal energy thereof, is taken from an outgoing air region of the aircraft.

6. The air conditioning arrangement according to claim 1, wherein the basic temperature-control means control the temperature of the air supply in the mixing chamber (i) as a function of a desired temperature value of each climate zone that is not associated with a combined heat and power engine, but (ii) independently and not as a function of a desired temperature value of each climate zone that is associated with a combined heat and power engine.

7. The air conditioning arrangement according to claim 1, wherein associated with the combined heat and power engine is a fan arrangement which generates or boosts a moderating air flow conveyed via a useful heat exchange surface of the engine and which is to be introduced into the associated sub-branching system of the relevant climate zone.

8. The air conditioning arrangement according to claim 7, wherein, in the flow direction of the moderating air flow on either side of the combined heat and power engine, the fan arrangement comprises at least one respective fan.

9. The air conditioning arrangement according to claim 7, wherein, in the flow direction of the moderating air flow on just one side of the combined heat and power engine, the fan arrangement comprises a fan.

10. The air conditioning arrangement according to claim 7, wherein at least one fan of the fan arrangement is in driving connection or can be brought into driving connection with a drive motor configured for operation in opposed directions of rotation and which is controlled by a control arrangement set up to reverse the direction of rotation of the drive motor.

* * * * *